United States Patent
Bierhuizen et al.

(10) Patent No.: US 7,940,341 B2
(45) Date of Patent: May 10, 2011

(54) LIGHT SOURCE FOR A PROJECTOR

(75) Inventors: Serge J. Bierhuizen, Santa Rosa, CA (US); Gerard Harbers, Sunnyvale, CA (US)

(73) Assignees: Philips Lumileds Lighting Company, San Jose, CA (US); Koninklijke Philips Electronics N.V., Eindhoven (NL)

( * ) Notice: Subject to any disclaimer, the term of this patent is extended or adjusted under 35 U.S.C. 154(b) by 690 days.

(21) Appl. No.: 11/844,214

(22) Filed: Aug. 23, 2007

(65) Prior Publication Data

US 2009/0051831 A1 Feb. 26, 2009

(51) Int. Cl.
*G02F 1/1335* (2006.01)
(52) U.S. Cl. .............................................. 349/5; 349/62
(58) Field of Classification Search ................ 349/5, 61, 349/62
See application file for complete search history.

(56) References Cited

U.S. PATENT DOCUMENTS

| | | | |
|---|---|---|---|
| 6,038,005 A | 3/2000 | Handschy et al. | |
| 6,220,714 B1 | 4/2001 | Eguchi | |
| 6,257,737 B1 | 7/2001 | Marshall et al. | |
| 6,504,301 B1 | 1/2003 | Lowery | |
| 6,542,307 B2 * | 4/2003 | Gleckman et al. | 359/638 |
| 6,964,489 B2 * | 11/2005 | Blume et al. | 362/27 |
| 7,052,152 B2 | 5/2006 | Harbers et al. | |
| 7,131,735 B2 | 11/2006 | Yokoyama | |
| 7,484,850 B2 * | 2/2009 | Sakata et al. | 353/20 |
| 2001/0048560 A1 | 12/2001 | Sugano | |

FOREIGN PATENT DOCUMENTS

| | | |
|---|---|---|
| EP | 1003064 A1 | 5/2000 |
| EP | 1418765 A1 | 5/2004 |
| JP | 10123512 A | 5/1998 |

* cited by examiner

*Primary Examiner* — Brian M. Healy
*Assistant Examiner* — Michael P Mooney

(57) ABSTRACT

A projector includes a plurality of illumination modules. Each illumination module includes a light source, such as a semiconductor light emitting diode, and an optical element configured to receive light from the light source and collimate the light into a beam. Light from the illumination modules is provided to a liquid crystal display panel, then a projection lens. In some embodiments, secondary optics, such as an array of Fresnel lenses or a reflective polarizer, are disposed between the illumination modules and the liquid crystal display panel. In some embodiments, the liquid crystal display panel is a low temperature polysilicon liquid crystal display.

17 Claims, 3 Drawing Sheets

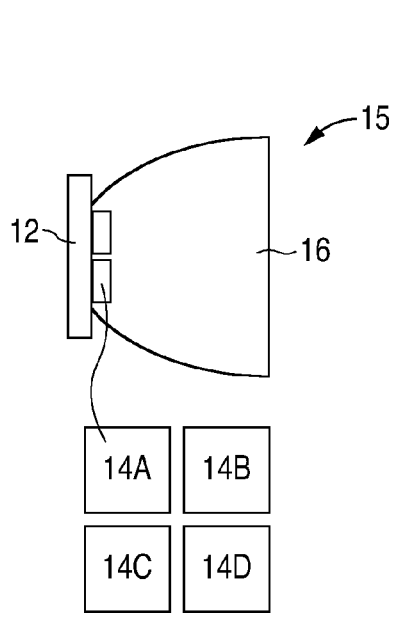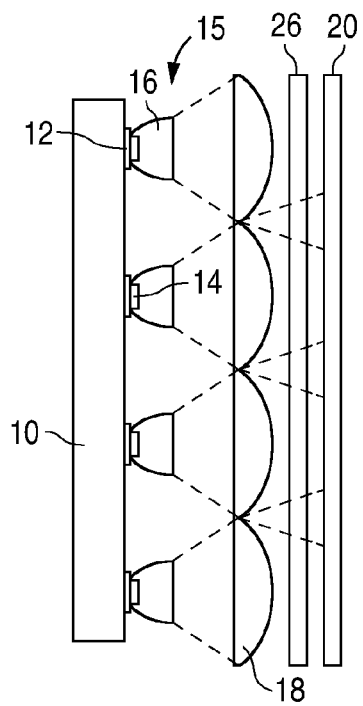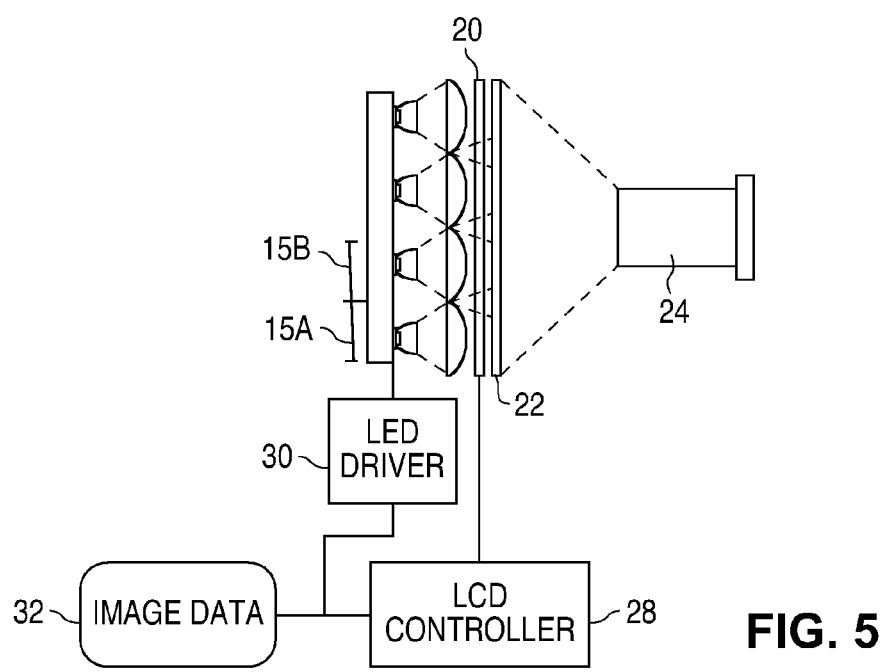
FIG. 3
FIG. 4
FIG. 5

LIGHT SOURCE FOR A PROJECTOR

BACKGROUND

1. Field of Invention

The present invention related to a light source that supplies a collimated beam to a system such as a projector.

2. Description of Related Art

Semiconductor light emitting devices such as light emitting diodes (LEDs) are among the most efficient light sources currently available. Material systems currently of interest in the manufacture of high brightness LEDs capable of operation across the visible spectrum include group III-V semiconductors, particularly binary, ternary, and quaternary alloys of gallium, aluminum, indium, and nitrogen, also referred to as III-nitride materials; and binary, ternary, and quaternary alloys of gallium, aluminum, indium, arsenic, and phosphorus. Often III-nitride devices are epitaxially grown on sapphire, silicon carbide, or III-nitride substrates and III-phosphide devices are epitaxially grown on gallium arsenide by metal organic chemical vapor deposition (MOCVD), molecular beam epitaxy (MBE), or other epitaxial techniques. III-V devices include a light emitting or active region sandwiched between an n-type region and a p-type region.

One promising use of semiconductor light emitting devices is as a light source in a projector, in which images on a liquid crystal display (LCD) are magnified and projected. In a common prior art projector, the LCD is illuminated by a metal halide or halogen lamp. The use of such lamps limits the degree to which the size of the light source, and therefore the size of the projector, can be reduced.

FIG. 1 is a perspective view of a prior art projector, described in more detail in U.S. Pat. No. 7,131,735. Light-emitting diodes (LEDs) 103 serving as point light sources are arranged in a planar arrangement facing an end face of a light guide body 102 (an acrylic resin square bar). The diodes are separate from light guide body 102. A liquid-crystal display element 101 is disposed facing the other end face of light guide body 102. Light emitted by the light-emitting end face of the light guide body 102 strikes liquid-crystal display element 101. The image displayed by the liquid-crystal display element 101 is magnified by a projection lens 104 and is projected onto a screen. The light guide body, which is necessary to mix the light from LEDs 103 in order to uniformly illuminate liquid crystal display element 101, makes the projector undesirably bulky.

SUMMARY

In accordance with embodiments of the invention, a projector includes a plurality of illumination modules. Each illumination module includes a light source, such as a semiconductor light emitting diode, and an optical element configured to receive light from the light source and collimate the light into a beam. Light from the illumination modules is provided to a liquid crystal display panel, then a projection lens.

In some embodiments, secondary optics, such as an array of Fresnel lenses or a reflective polarizer, are disposed between the illumination modules and the liquid crystal display panel. In some embodiments, the liquid crystal display panel is a low temperature polysilicon liquid crystal display.

Since each light source is associated with its own primary optic, the primary optics may be smaller than a primary optic shared by all light sources, such as the light guide body illustrated in FIG. 1. As a result, projectors incorporating such illumination modules may be smaller, thinner, and less expensive to produce than conventional projectors. In addition, since each illumination module lights a portion of the liquid crystal display panel, the amount of power supplied to each illumination module may be adjusted based on the image displayed, potentially reducing power consumption and improving the contrast of the projected image.

BRIEF DESCRIPTION OF THE DRAWINGS

FIG. 3 illustrates an illumination module with multiple LEDs.

FIG. 4 is a cross sectional view of a projector including a polarizer.

FIG. 5 illustrates a system for adjusting the brightness of each illumination module for a given set of image data.

DETAILED DESCRIPTION

In accordance with embodiments of the invention, an illumination module includes one or more LEDs combined with an optic. Each illumination module can supply a collimated white light beam. Multiple illumination modules may be used, for example, in conjunction with a transmissive LCD panel and projection lens, to project images on a wall or screen. The system is easily scaled by adding or subtracting illumination modules.

Figure 2:
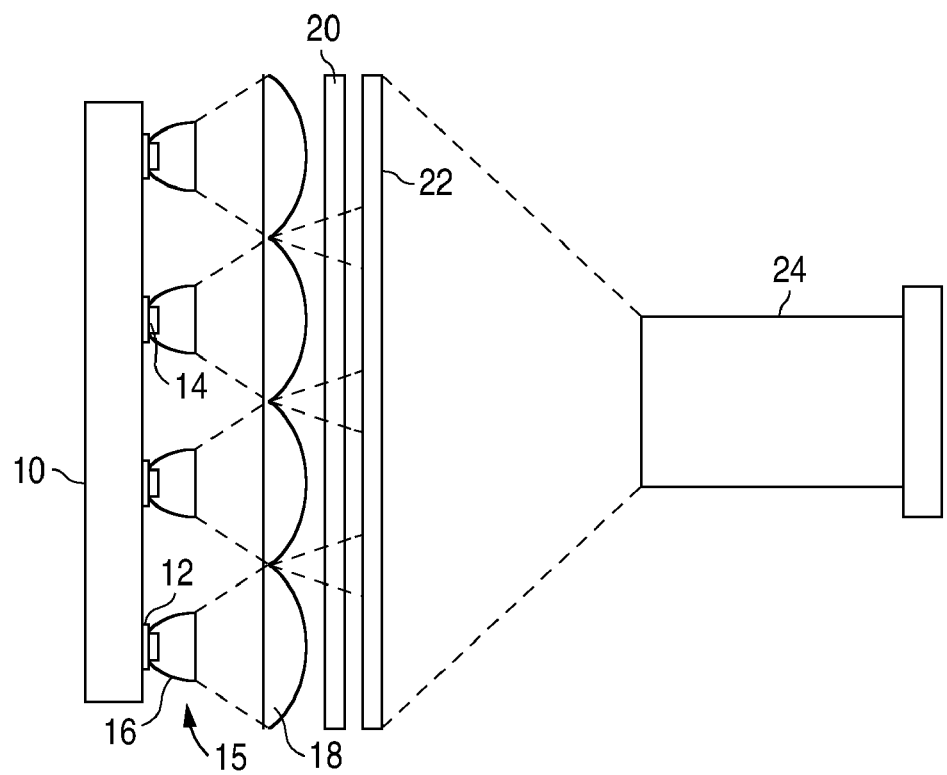
FIG. 2 is a cross sectional view of a projector according to embodiments of the invention.

FIG. 2 is a cross sectional view of a projector according to a first embodiment. One or more illumination modules 15 are provided, mounted on an optional heat sink 10. Each illumination module includes a light source 14 mounted on mount 12. A primary optic 16 is disposed over LED 14. Each illumination module 15 is aligned with a secondary optic 18. An LCD panel 20 receives light from secondary optics 18. The light is then incident on a lens 22, which may be, for example, a Fresnel lens, and a projection lens 24. Lens 22 may be tilted for key-stone correction of the projected image, if the projected image is tilted with respect to the surface on which the image is projected.

Each illumination module 15 includes a light source that emits white light. Suitable light sources include a single LED, as illustrated in FIG. 2, or multiple LEDs. Suitable LEDs may be configured to emit a majority of light from the side of the LED, or from the top of the LED, as is known in the art. An example of a suitable single LED is a blue- or UV-emitting LED combined with one or more phosphors such that the light emitted by the phosphors and possibly by the LED mixes and appears white.

FIG. 3 is a cross sectional view of an illumination module including multiple LEDs and a plan view of four LEDs used in the illumination module. Four LEDs 14A, 14B, 14C, and 14D are mounted on mount 12 arranged in a square, then placed within or near primary optic 16. More or fewer LEDs and arrangements other than square may be used. Each of LEDs 14A-D may be a phosphor-converted LED that emits white light, or a combination of red-emitting, green-emitting, and blue-emitting LEDs may be used, or a combination of red-emitting, green-emitting, blue-emitting, and white-emitting LEDs may be used.

Primary optic 16 collimates the light from light source 14 into a cone of light. In some embodiments, primary optic 16 collimates the light into a cone smaller than 2×60° (i.e. 60° from normal). When the cone is smaller than 2×12°, the size of primary optic 16 may be undesirably large. Examples of suitable primary optics 16 include rectangular or square open collimators or a compound parabolic concentrator, formed by, for example, depositing a reflective film such as aluminum or silver on plastic; or a solid plastic or glass lens.

Secondary optics 18 collimate the beams from each illumination module into small illumination beams, for example no larger than 2×18.2° cones, corresponding to an illumination F# of 1.6, depending on the LCD dimensions, but can be as small as 2×3°, corresponding to an F# of 10. Examples of suitable secondary optics 18 include Fresnel lenses or dome lenses. Secondary optics 18 may be formed, for example, as an array of lenses in a single sheet of lens material.

Each illumination module 15 lights a portion of LCD 20. As illustrated in FIG. 2, the light beams from neighboring illumination modules 15 may overlap at the surface of LCD 20. The overlap may desirably reduce the appearance of the boundary between neighboring illumination modules, particularly in systems including electronics for adjusting the brightness of each module depending on the image data, as described below. The amount of overlap is a function of the focal length of secondary optic 18 and the distance between secondary optic 18 and LCD 20.

LCD 20 may be, for example, a low temperature polysilicon (LTPS) LCD, or any other suitable LCD. The projection system shown in FIG. 2 is a color projection system, thus LCD 20 produces color images, for example with color filters to create red, green, and blue subpixels as is known in the art.

LTPS LCDs are commonly used in small displays such as cell phone and personal digital assistant displays. Suitable LTPS LCDs are available from TPO of Chunan, Taiwan. Suitable rectangular LCD panels available from TPO are, for example, between 2.8 and 4.3 inches on a diagonal, although LCD panels as small as one inch on a diagonal can be used.

In some embodiments, brightness between 50 and 1,000 lumens (lm) out of projection lens 24 of the system illustrated in FIG. 2 may be required, though in some embodiments such as ultra-portable devices, reduced brightness may be acceptable. LTPS LCD panels often have a transmission efficiency around 5% for unpolarized white light. To create 50 lm output from projection lens 24 at 5% LCD panel transmission efficiency and 50% optical components efficiency (i.e. lens 22, projection lens 24, and illumination overfill area at the LCD), the array of illumination modules must produce at least 2,000 lm; to create 250 lm output, the array must produce at least 10,000 lm. White LEDs are available that produce 100 lm per $mm^2$ of die area at an electrical input power of 2.5 W. For a 50 lm projector, 20 such LEDs are required. For example, a 4×5 array of illumination modules 15, each with a single white LED 14, may be used, with total power consumption of 50 W. For a 250 lm projector, 100 LEDs are required, with total power consumption of 250 W.

The etendue of the system illustrated in FIG. 2 is related to the area of LCD panel 20, the F-number of projection lens 24, which should correspond to the die area of LED light source 14, the collected cone angle, and illumination optics design parameters such as illumination overfill area at the LCD. The inventors calculated an etendue of 61 $mm^2sr$ at an LED die area of 20 $mm^2$ emitting light in a Lambertian emission pattern, which corresponds to the performance of a system according to FIG. 2 with 50 lm of output from projection lens 24.

Conventional projectors may use high temperature polysilicon panels, or micro-electro-mechanical system (MEMS) based systems, such as digital light processing (DLP) rear projection televisions. These types of displays require high luminance sources, and can be expensive due to complicated optics, and a relatively low volume of production and yield. In contrast, when an LTPS LCD is used, the cost and size of the display may be reduced over conventional projectors.

In some embodiments, a polarizer is included between the illumination modules and the LCD, as illustrated in FIG. 4. Most LCDs require polarized light, thus it may improve the performance of the projector to include a reflective polarizer 26 between secondary optics 18 and LCD 20. Light with polarization that cannot be used by LCD 20 is reflected by polarizer 26 back toward secondary optics 18, where it can potentially be reflected to a usable polarization and eventually escape polarizer 26. Accordingly, polarizer 26 may improve the efficiency of the system and reduce power consumption.

Since each illumination module 15 illuminates a portion of LCD panel 20, the brightness from each illumination module 15 may be adjusted for a given set of image data, as illustrated in FIG. 5. Image data 32, which are provided to LCD controller 28 so LCD 20 can form the appropriate image, are also provided directly or indirectly to LED driver 30. For example, for a given image, the portion of the image corresponding to illumination module 15A may be darker, while the portion of the image corresponding to illumination module 15B may be brighter. LED driver 30 may receive that image data, and in response provide more power to illumination module 15B to produce more light, and less power to illumination module 15A to produce less light. Adjusting the brightness of each illumination module to correspond to the image data may improve the contrast and reduce the power consumption of the projector.

Figure 6:
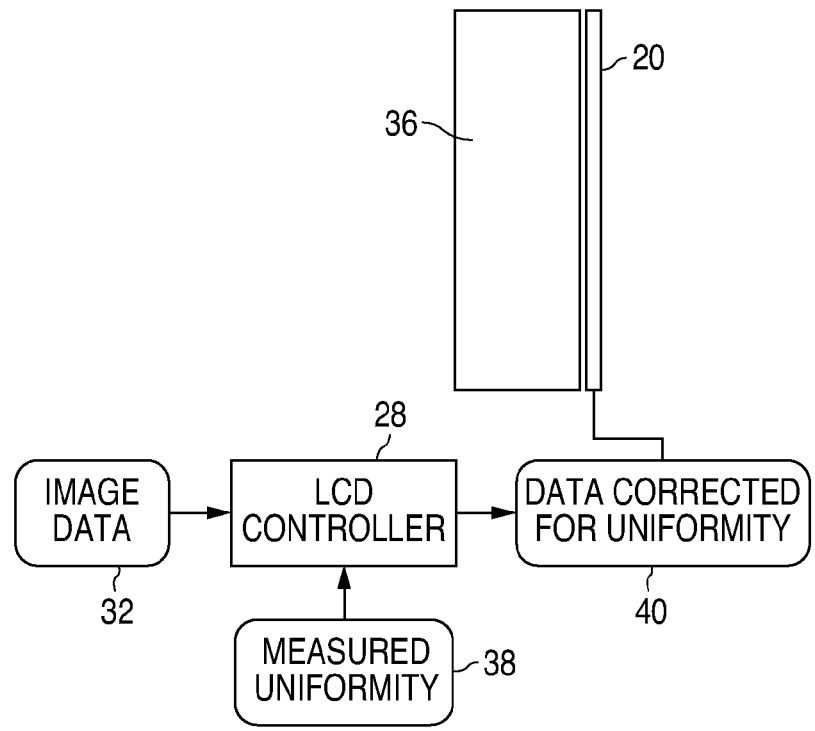
FIG. 6 illustrates a system for correcting image data for the actual illuminance uniformity in a projector.

In some embodiments, the illuminance uniformity can be improved electronically, such as by the system illustrated in FIG. 6, allowing higher efficiency optics that may be not sufficiently uniform without electronic improvement.

In the system illustrated in FIG. 6, the illumination segments 15 and secondary optics 18 are shown as block 36. LCD controller 28 receives image data 32 and measured illuminance uniformity data 38. LCD controller 28 corrects the image data to match the actual, measured illuminance 38 of each part of LCD panel 20. The corrected data 40 is then provided to LCD 20.

Figure 7:
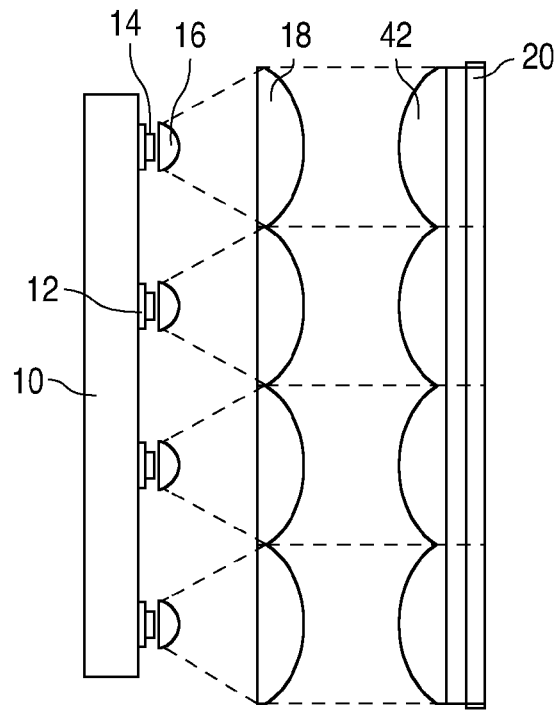
FIG. 7 is a cross sectional view of a part of a projector with a double lenslet array to illuminate an LCD.

In an alternative embodiment illustrated in FIG. 7, a lenslet array integrator 42 is disposed between secondary optics 18 and LCD panel 20.

Figure 1:
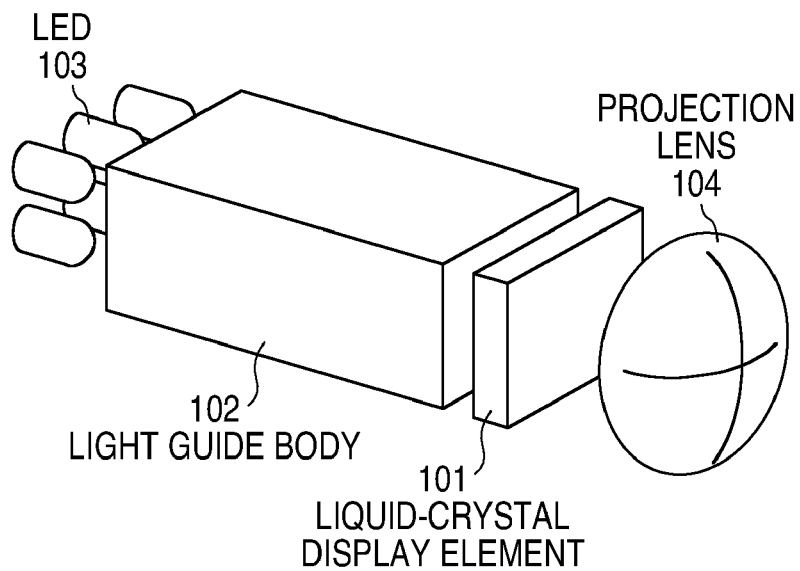
FIG. 1 is a perspective view of a prior art projector.

The projectors described in the embodiments above may offer advantages over prior art projectors, such as the projector illustrated in FIG. 1. Since each light source is associated with a primary optic, the primary optics may be smaller than a primary optic shared by all light sources, such as the light guide body illustrated in FIG. 1. The illumination modules described in embodiments of the invention may thus be thinner than conventional light sources, for example between half an inch and an inch thick. As a result, projectors incorporating such illumination modules may be smaller, thinner, and less expensive than conventional projectors.

Having described the invention in detail, those skilled in the art will appreciate that, given the present disclosure, modifications may be made to the invention without departing from the spirit of the inventive concept described herein. Therefore, it is not intended that the scope of the invention be limited to the specific embodiments illustrated and described.

What is being claimed is:
1. A device comprising:
   a plurality of illumination modules, each illumination module comprising:
      a light source; and a first optical element configured to receive light from the light source and collimate the light into a beam, wherein the light source comprises at least one semiconductor light emitting device;

a liquid crystal display panel; and a projection lens;

wherein the liquid crystal display panel is disposed between the plurality of illumination modules and the projection lens, wherein each illumination module illuminates only a portion of the liquid crystal display panel, wherein the portion of the liquid crystal display panel is less than the entirety of the liquid crystal display panel.

2. The device of claim 1 wherein each optical element in the plurality of illumination modules is a first optical element, the device further comprising at least one second optical element, wherein the at least one second optical element is disposed between the plurality of illumination modules and the liquid crystal display panel.

3. The device of claim 1 wherein the semiconductor light emitting device emits white light.

4. The device of claim 1 wherein each light source comprises a semiconductor light emitting device that emits blue light, a semiconductor light emitting device that emits green light, and a semiconductor light emitting device that emits red light.

5. The device of claim 2 wherein each first optical element comprises a lens.

6. The device of claim 2 wherein each first optical element emits a light beam in a cone of light between 2×12° and 2×60°.

7. The device of claim 2 wherein each second optical element comprises a Fresnel lens.

8. The device of claim 2 wherein the plurality of second optical elements are formed in a single piece of material.

9. The device of claim 2 wherein the second optical element comprises a reflective polarizer.

10. The device of claim 1 further comprising a driver circuit, wherein the driver circuit is connected to the plurality of illumination modules and configured to receive image data and provide power to each illumination module based on the image data.

11. The device of claim 1 wherein the liquid crystal display panel is a low temperature polysilicon liquid crystal display panel.

12. The device of claim 1 wherein the liquid crystal display panel receives a light beam in a cone of light between 2×3° and 2×18.2°.

13. The device of claim 2 wherein each second optical element is configured to emit a light beam in a cone of light between 2×3° and 2×18.2°.

14. A device comprising:

a plurality of illumination modules, each illumination module comprising:
  a light source; and
  an optical element configured to receive light from the light source and collimate the light into a beam wherein the optical element comprises a compound parabolic concentrator;

a liquid crystal display panel; and a projection lens;

wherein the liquid crystal display panel is disposed between the plurality of illumination modules and the projection lens, wherein each illumination module illuminates only a portion of the liquid crystal display panel, wherein the portion of the liquid crystal display panel is less than the entirety of the liquid crystal display panel.

15. A device comprising:

a plurality of illumination modules, each illumination module comprising:
  a light source; and
  an optical element configured to receive light from the light source and collimate the light into a beam wherein the optical element comprises a reflector;

a liquid crystal display panel; and a projection lens;

wherein the liquid crystal display panel is disposed between the plurality of illumination modules and the projection lens, wherein each illumination module illuminates only a portion of the liquid crystal display panel, wherein the portion of the liquid crystal display panel is less than the entirety of the liquid crystal display panel.

16. A device comprising:

a plurality of illumination modules, each illumination module comprising:
  a light source; and
  a first optical element configured to receive light from the light source and collimate the light into a beam;

a liquid crystal display panel;

a plurality of second optical elements, wherein the plurality of second optical elements are disposed between the plurality of illumination modules and the liquid crystal display panel, wherein each of the second optical elements is aligned with an illumination module; and a projection lens;

wherein the liquid crystal display panel is disposed between the plurality of second optical elements and the projection lens, wherein each illumination module illuminates only a portion of the liquid crystal display panel, wherein the portion of the liquid crystal display panel is less than the entirety of the liquid crystal display panel.

17. A device comprising:

a plurality of illumination modules, each illumination module comprising:
  a light source; and
  an optical element configured to receive light from the light source and collimate the light into a beam;

a liquid crystal display panel;

at least one second optical element, wherein the at least one second optical element is disposed between the plurality of illumination modules and the liquid crystal display panel;

an array of lenses disposed between the second optical element and the liquid crystal display; and a projection lens;

wherein the liquid crystal display panel is disposed between the array of lenses and the projection lens, wherein each illumination module illuminates only a portion of the liquid crystal display panel, wherein the portion of the liquid crystal display panel is less than the entirety of the liquid crystal display panel.

* * * * *